(12) United States Patent
Hu et al.

(10) Patent No.: US 11,294,172 B2
(45) Date of Patent: Apr. 5, 2022

(54) OPTICAL ELEMENT DRIVING MECHANISM

(71) Applicant: TDK TAIWAN CORP., Yangmei Taoyuan (TW)

(72) Inventors: Chao-Chang Hu, Yangmei Taoyuan (TW); Shu-Shan Chen, Yangmei Taoyuan (TW); Cheng-Kai Yu, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 186 days.

(21) Appl. No.: 15/841,550

(22) Filed: Dec. 14, 2017

(65) Prior Publication Data

US 2018/0188527 A1 Jul. 5, 2018

Related U.S. Application Data

(60) Provisional application No. 62/441,696, filed on Jan. 3, 2017.

(30) Foreign Application Priority Data

Nov. 8, 2017 (CN) .......................... 201711091032.7

(51) Int. Cl.
*G02B 27/00* (2006.01)
*G02B 27/64* (2006.01)
(Continued)

(52) U.S. Cl.
CPC ......... *G02B 27/0075* (2013.01); *G01B 7/003* (2013.01); *G01B 7/30* (2013.01);
(Continued)

(58) Field of Classification Search
CPC .. G02B 7/1805; G02B 27/646; G02B 13/001; G02B 7/005; G02B 27/64; G02B 7/09;
(Continued)

(56) References Cited

U.S. PATENT DOCUMENTS

2012/0099201 A1* 4/2012 Chan .................... G02B 27/646
359/557
2014/0362242 A1* 12/2014 Takizawa ............. H04N 5/2254
348/208.11
(Continued)

FOREIGN PATENT DOCUMENTS

| CN | 103649828 A | 3/2014 |
|---|---|---|
| JP | 2015194660 A | 11/2015 |
| WO | WO-2015133759 A1 * | 9/2015 |

OTHER PUBLICATIONS

Office Action dated Jan. 20, 2021 for the corresponding Application No. 201711091032.7 in China.

*Primary Examiner* — Jade R Chwasz
(74) *Attorney, Agent, or Firm* — Muncy, Geissler, Olds & Lowe, P.C.

(57) ABSTRACT

An optical element driving mechanism includes a fixed module, a movable module, an optical element, a first sensing magnet, and a first sensing element. The movable module is movably connected to the fixed module. The optical element is disposed on the movable module. The first sensing magnet is disposed corresponding to the optical element, and has a polar direction. The first sensing element is disposed corresponding to the first sensing magnet for sensing displacement of the first sensing magnet relative to the fixed module in a first direction, wherein the first direction is perpendicular to the polar direction.

17 Claims, 8 Drawing Sheets

(51) Int. Cl.
*G01D 5/12* (2006.01)
*G01B 7/30* (2006.01)
*G02B 7/08* (2021.01)
*G01B 7/00* (2006.01)
*G01D 5/14* (2006.01)

(52) U.S. Cl.
CPC ............... *G01D 5/12* (2013.01); *G02B 7/08* (2013.01); *G02B 27/64* (2013.01); *G02B 27/646* (2013.01); *G01D 5/145* (2013.01)

(58) Field of Classification Search
CPC .... G02B 13/0065; G02B 7/023; G02B 26/08; G02B 26/0891; G02B 26/101; G02B 26/108; H02K 41/0356; H02K 7/06; H02K 2201/18; G03B 5/00; G03B 2205/003; G03B 2205/0069
USPC ...... 359/831, 833, 202.1, 203.1, 213.1, 872, 359/873, 874, 876, 881
See application file for complete search history.

(56) References Cited

U.S. PATENT DOCUMENTS

2016/0109721 A1* 4/2016 Min .................. H04N 5/2252
359/557
2017/0017056 A1* 1/2017 Park .................. G02B 7/08

* cited by examiner

_US 11,294,172 B2_

OPTICAL ELEMENT DRIVING MECHANISM

CROSS REFERENCE TO RELATED APPLICATIONS

This application claims the benefit of U.S. Provisional Application No. 62/441,696, filed Jan. 3, 2017, and claims priority of China Patent Application No. 201711091032.7, filed Nov. 8, 2017, the entirety of which are incorporated by reference herein.

BACKGROUND

Technical Field

The disclosure relates to an optical element driving mechanism, and in particular to an optical element driving mechanism with directional magnetic sensors.

Description of the Related Art

Currently, Hall effect sensors and corresponding magnets are usually used to detect displacement in voice coil motors (VCM). When Hall effect sensors are used in measuring large-angle rotation, two Hall effect sensors are required on each axis to perform a difference calculation. This increases the volume of the driving mechanism and makes the circuit more complicated. Another disadvantage is that the sensitivity of the Hall effect sensors is not adequate to measure small-angle rotation. In addition, in order to avoid signal interference due to rotation or displacement in the other axial directions, at least one sensing magnet corresponding to one Hall effect sensor is required in each axis, making circuit wiring and mechanism miniaturizing difficult.

BRIEF SUMMARY

Some embodiments of the disclosure provide an optical element driving mechanism, including: a fixed module, a movable module, an optical element, a first sensing magnet, and a first sensing element. The movable module is movably connected to the fixed module. The optical element is disposed on the movable module. The first sensing magnet is disposed corresponding to the optical element, and has a polar direction. The first sensing element is disposed corresponding to the first sensing magnet for sensing the displacement of the first sensing magnet relative to the fixed module in a first direction, wherein the first direction is perpendicular to the polar direction.

In an embodiment, the first sensing element is a magnetoresistance sensor.

In an embodiment, the optical element driving mechanism further includes a second sensing element disposed corresponding to the first sensing magnet for sensing the displacement of the first sensing magnet relative to the fixed module in a second direction, wherein the second direction is perpendicular to the first direction.

In an embodiment, the optical element driving mechanism further includes a circuit board, and the first and second sensing elements are disposed on opposite sides of the circuit board.

In an embodiment, when observed from the polar direction, the first sensing element at least partially overlaps the second sensing element.

In an embodiment, the optical element driving mechanism further includes a second sensing element and a second sensing magnet corresponding to each other, the second sensing magnet is disposed on the movable module, and the second sensing magnet is movable relative to the first sensing magnet, wherein the second sensing element senses the displacement of the second sensing magnet relative to the fixed module in a second direction, wherein the second direction is perpendicular to the first direction.

In an embodiment, the optical element driving mechanism further includes a magnetic sensor corresponding to the first sensing magnet for sensing the amount of rotation of the first sensing magnet relative to the fixed module around an axial direction, wherein the axial direction is perpendicular to the polar direction.

In an embodiment, when observed from the polar direction, the first sensing element at least partially overlaps the first sensing magnet.

In an embodiment, a projected area of the first sensing magnet on a reference surface is greater than that of the first sensing element on the reference surface, wherein the reference surface is perpendicular to the polar direction.

In an embodiment, the first sensing element is adjacent to an edge of the first sensing magnet.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical element driving mechanisms of some embodiments of the present disclosure are described in the following description. However, it should be appreciated that the following detailed description of some embodiments of the disclosure provides various concepts of the invention which may be performed in widely various specific background. The specific embodiments disclosed are provided merely to clearly describe the usage of the invention in some specific methods without limiting the scope of the invention.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Figure 1:
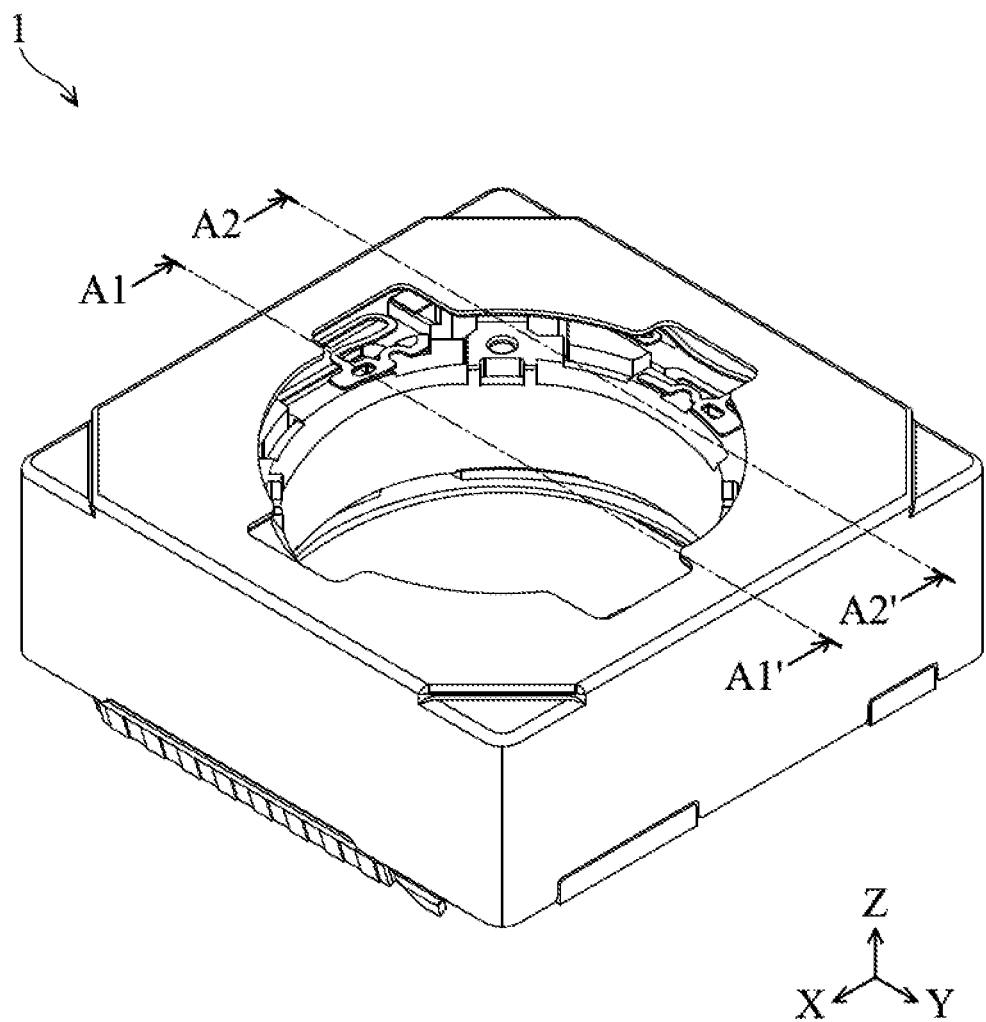
FIG. 1 is a schematic perspective view illustrating an optical element driving mechanism in accordance with an embodiment of the present disclosure.
Figure 2:
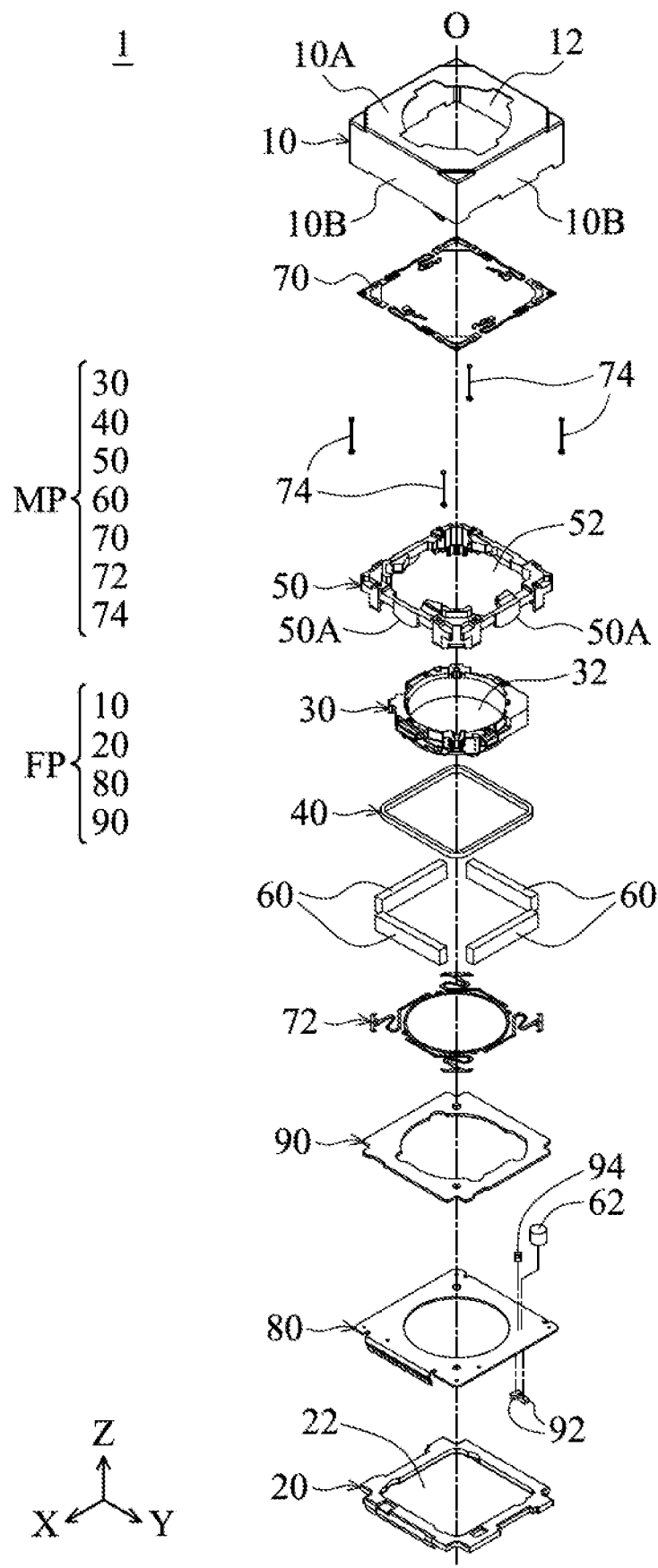
FIG. 2 is an exploded diagram illustrating the optical element driving mechanism in FIG. 1.
Figure 3A:
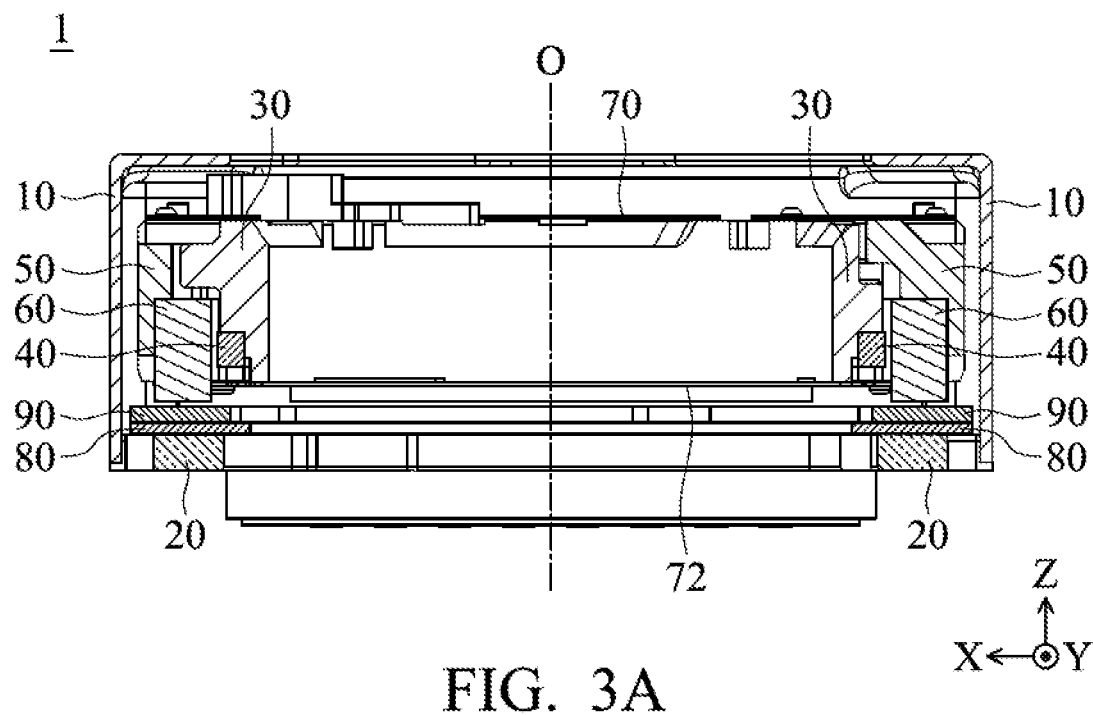
FIG. 3A is a cross-sectional view illustrating the optical element driving mechanism along the line A1-A1' in FIG. 1.
Figure 3B:
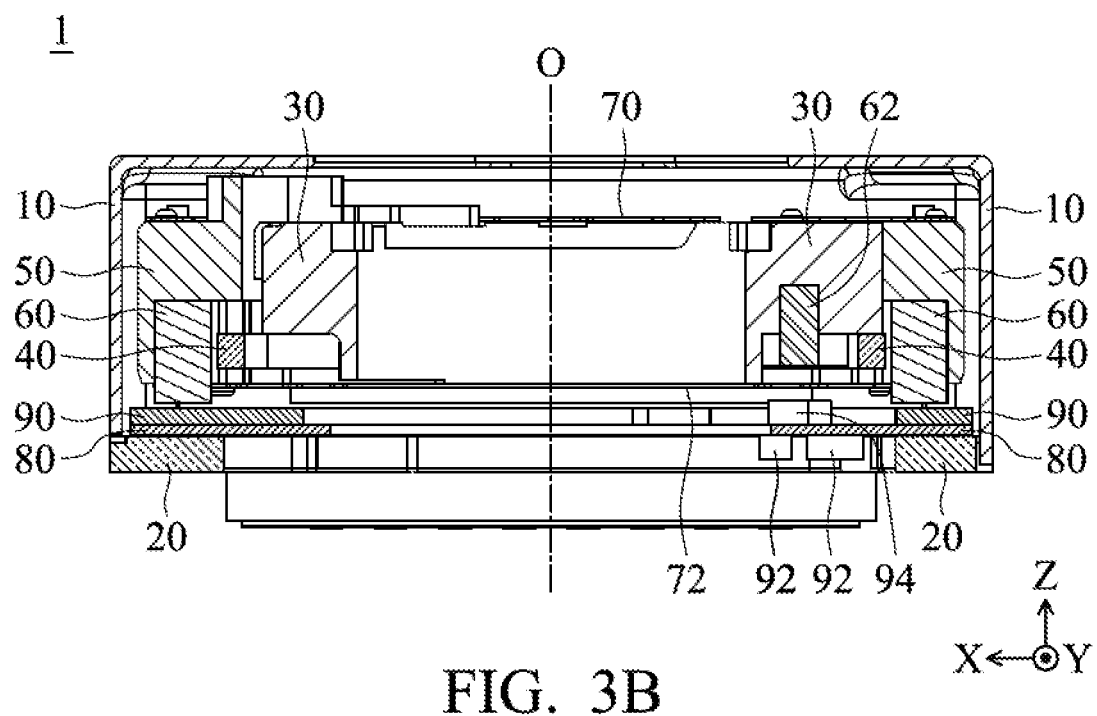
FIG. 3B is a cross-sectional view illustrating the optical element driving mechanism along the line A2-A2' in FIG. 1.

Referring to FIGS. 1 to 3B, wherein FIG. 1 is a schematic perspective view illustrating an optical element driving mechanism 1 in accordance with an embodiment of the present disclosure, FIG. 2 is an exploded diagram illustrating the optical element driving mechanism 1 in FIG. 1, and FIGS. 3A and 3B are cross-sectional views illustrating the optical element driving mechanism along the lines A1-A1' and A2-A2' in FIG. 1, respectively. It should be noted that in this embodiment, the optical element driving mechanism 1 may be, for example, disposed in the electronic devices with camera function, and can perform auto-focusing (AF) and optical image stabilization (OIS) functions.

As shown in FIGS. 1 to 3B, the optical element driving mechanism 1 mainly includes a housing 10, a base 20, a holder 30, a driving coil 40, a frame 50, a plurality of magnetic elements 60, a first sensing magnet 62, an upper leaf spring 70, a lower leaf spring 72, a plurality of suspension wires 74, a circuit board 80, a driving board 90, at least one first sensing element 92, and a second sensing element 94.

The housing 10 has a hollow structure, a top wall 10A, and four sidewalls 10B, and can be connected to the base 20. It should be appreciated that openings 12 and 22 are formed on the housing 10 and the base 20, respectively. The center of the opening 12 corresponds to an optical axis O of an optical element (not shown). The opening 22 corresponds to an image-sensing element (not shown) disposed outside the optical element driving mechanism 1, and thereby the optical element disposed in the optical element driving mechanism 1 can perform a focusing function with the image-sensing element in the direction of the optical axis O.

The holder 30 has a hollow structure, and a through hole 32 is formed therein, wherein the optical element is secured in the through hole 32.

The frame 50 has an opening 52 and four recesses 50A, wherein the recesses 50A respectively correspond to the four sidewalls 10B of the housing 10. Four magnetic elements 60 can be fixed in the four recesses 50A. In some embodiments, the four magnetic elements 60 can also be fixed in the four corners of the frame 50, and the magnetic elements 60 have a longitudinal structure.

FIG. 3A is a cross-sectional view illustrating the optical element driving mechanism 1 along the line A1-A1' in FIG. 1. As shown in FIGS. 2 and 3A, the holder 30 and the frame 50 are movably connected to the housing 10 and the base 20. To be more specific, the holder 30 and the frame 50 are connected by the upper leaf spring 70 and the lower leaf spring 72, which are made of metal materials, and thereby the holder 30 is suspended in the center of the frame 50.

In addition, one end of each of the four suspension wires 74 is connected to the base 20, and the other end is connected to the upper leaf spring 70, and thereby the frame 50 and the holder 30 and the optical element disposed therein can move along the horizontal direction (XY-plane) relative to the housing 10. The material of the suspension wires 74 can include, for example, metal.

In this embodiment, the circuit board 80 is electrically connected to a driving unit (not shown) disposed outside the optical element driving mechanism 1 for performing auto-focusing (AF) and optical image stabilization (OIS) functions. The magnetic elements 60 and the driving coil 40 disposed outside the holder 30 can constitute an electromagnetic driving assembly. When a current is applied to the circuit board 80, by an electromagnetic driving force generated by the driving coil 40 and the magnetic elements 60, the holder 30 and the optical element can be forced to move along the Z-axis direction (the direction of the optical axis O) relative the frame 50 to perform an auto-focusing (AF) function.

The driving board 90 is, for example, a printed circuit board (PCB). At least one coil (not shown) corresponding to the magnetic elements 60 is disposed inside the driving board 90. An electromagnetic driving force is generated between the magnetic elements 60 and the driving board 90 such that the holder 30 and the optical element are forced to move along the direction perpendicular to the direction of the optical axis O (parallel to the XY-plane) relative to the driving board 90. Therefore, the displacement in the X-axis and Y-axis directions is compensated, and the optical image stabilization (OIS) function is achieved.

It should be noted that the electrical signals may be sent to the driving coil 40 outside the holder 30 and the coils (not shown) disposed in the driving plate 90 through the circuit board 80, and the circuit board 80 may also send the electrical signals to the driving coil 40 through the suspension wires 74 and the upper leaf spring 70, and thereby the movements of the holder 30 and the frame 50 in the X-axis, Y-axis and Z-axis directions are controlled.

As set forth above, the holder 30, the driving coil 40, the frame 50, the magnetic elements 60, the upper leaf spring 70, the lower leaf spring 72 and the suspension wires 74 may constitute a movable module MP. In addition, the housing 10, the base 20, the circuit board 80 and the driving board 90 may constitute a fixed module FP, wherein the movable module MP can move relative to the fixed module FP along the horizontal or perpendicular direction.

FIG. 3B is a cross-sectional view illustrating the optical element driving mechanism 1 along the line A2-A2' in FIG. 1. As shown in FIGS. 2 and 3B, in the optical element driving mechanism 1, a first sensing magnet 62 corresponding to the optical element (not shown) is disposed on the holder 30, and the polar direction of the first sensing magnet 62 is parallel to the direction of the optical axis O (Z-axis direction).

In this embodiment, first sensing elements 92 and a second sensing element 94, which are corresponding to the first sensing magnet 62 and electrically connected to the circuit board 80, are disposed on the top and bottom sides of the circuit board 80, respectively. The first sensing elements 92 and the second sensing element 94 can be magnetoresistive (MR) sensors, such as tunnel magnetoresistance (TMR) sensors, giant magnetoresistance (GMR) sensors, or any other suitable MR sensors, and thereby the sensing elements 92 and the second sensing element 94 can be used to detect the magnetic field change of the first sensing magnet 62 to obtain the displacement of the movable module MP relative to the fixed module FP in the X-axis, Y-axis, and Z-axis directions.

Figure 4:
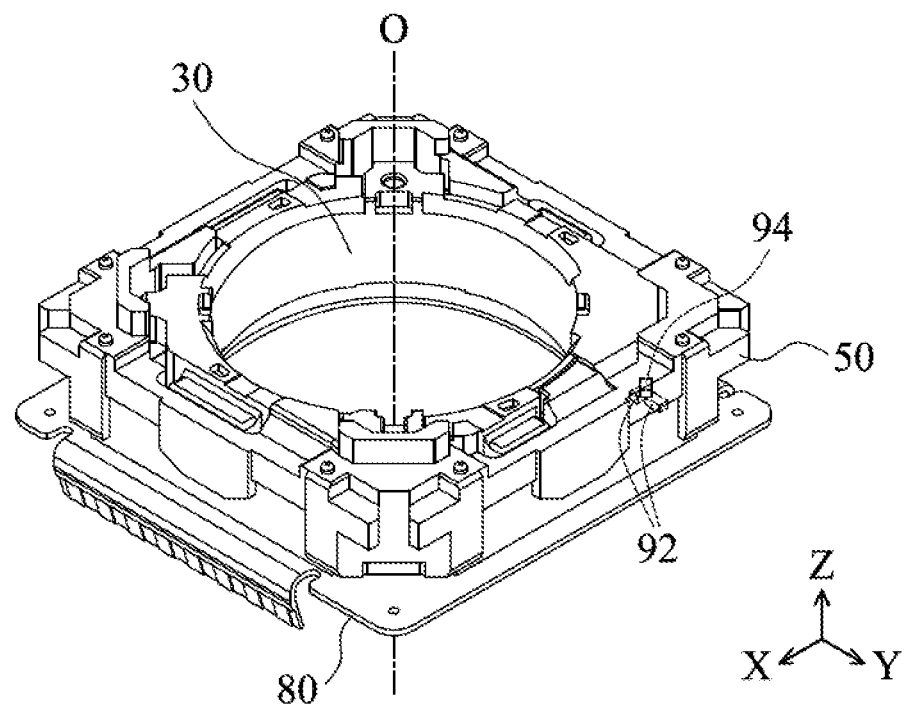
FIG. 4 is a schematic view illustrating relative positions between a holder, a frame, a circuit board, and sensing elements after assembly in accordance with an embodiment of the present disclosure.
Figure 5:
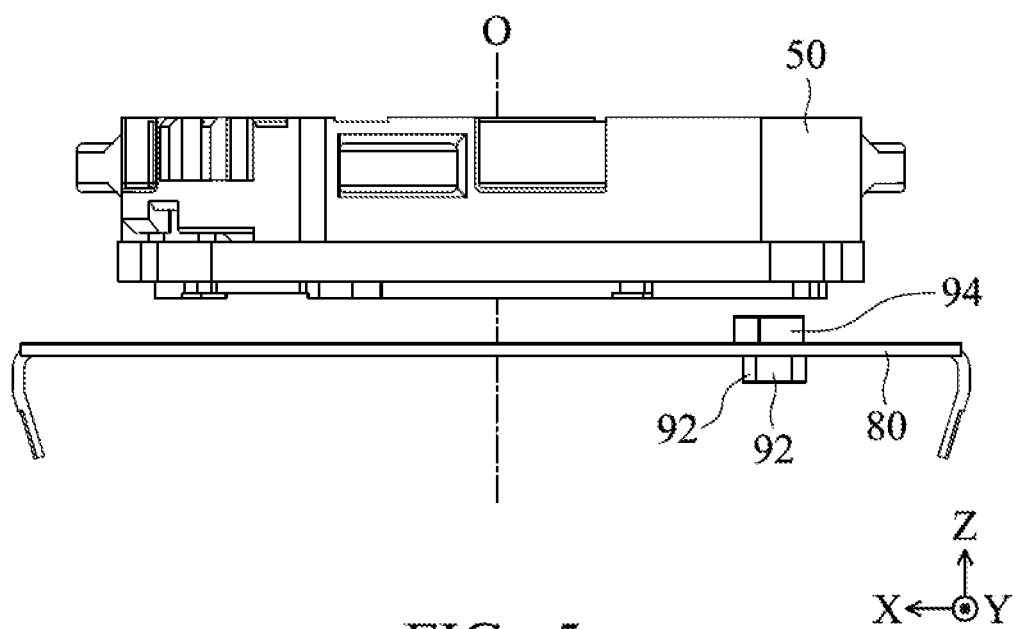
FIG. 5 is a side view illustrating the frame, the circuit board, and the sensing elements shown in FIG. 4.
Figure 6:
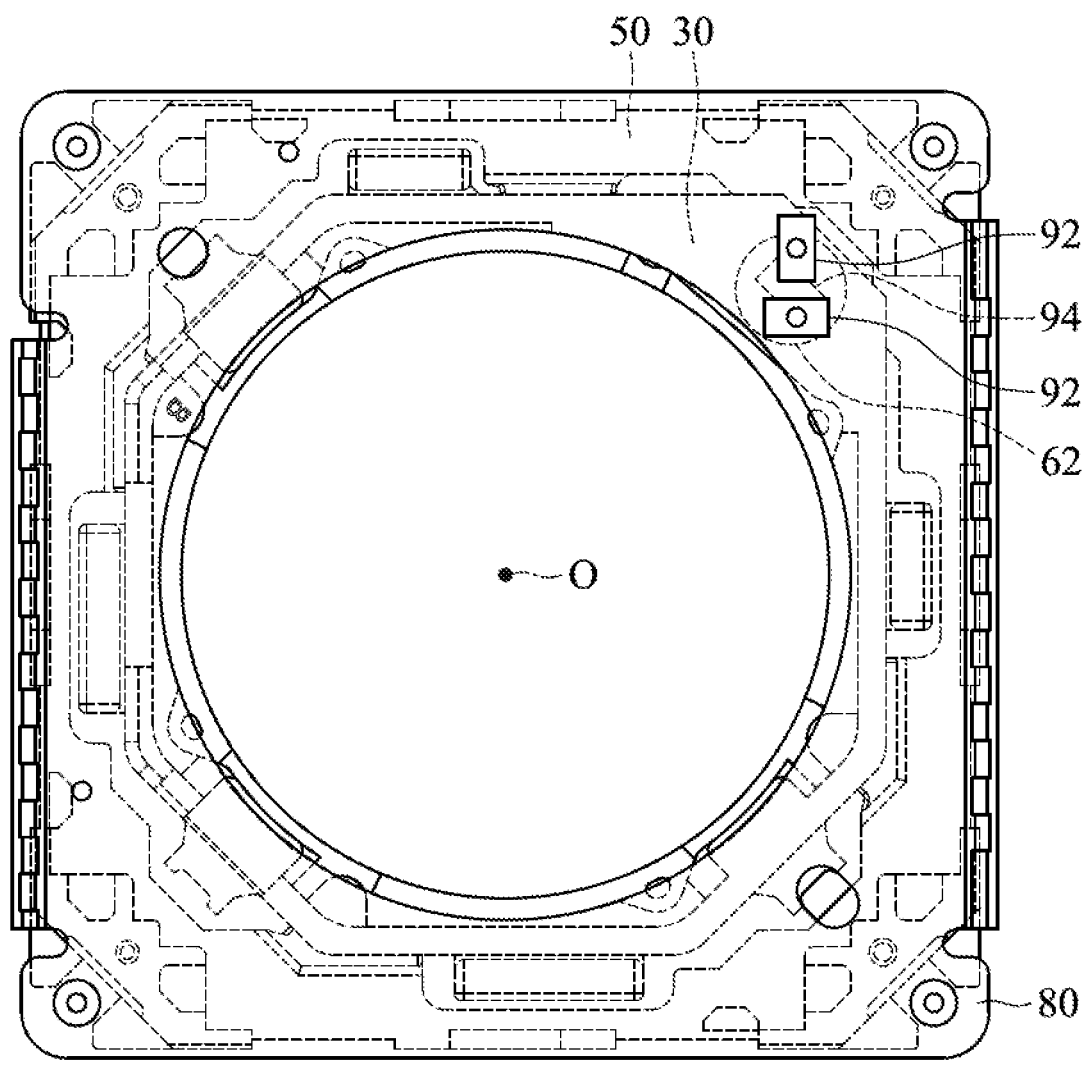
FIG. 6 is a bottom view illustrating the holder, the frame, the circuit board, and the sensing elements shown in FIG. 4.

Referring to FIGS. 4 to 6, FIG. 4 is a schematic view illustrating relative positions between the holder 30, the frame 50, the circuit board 80, the first sensing elements 92, and the second sensing element 94 shown in FIG. 3B after assembly. FIG. 5 is a side view illustrating the frame 50, the circuit board 80, the first sensing elements 92, and the second sensing element 94 shown in FIG. 4. FIG. 6 is a bottom view illustrating the holder 30, the frame 50, the circuit board 80, the first sensing elements 92, and the second sensing element 94 shown in FIG. 4. As shown in FIG. 5, the first sensing elements 92 and the second sensing element 94 are respectively disposed on two planes of the circuit board 80, and the planes are perpendicular to the polar direction (Z-axis direction) of the first sensing magnet 62. In this embodiment, the first sensing elements 92 are disposed below the circuit board 80, and the second sensing element 94 is disposed over the circuit board 80. In some embodiments, the position of the first sensing elements 92 and that of the second sensing element 94 may also be exchanged.

The first sensing elements 92 are configured to sense the displacement of the first sensing magnet 62 relative to the fixed module FP along a horizontal direction (XY-plane), wherein the horizontal direction (a first direction) is perpendicular to the optical axis O and the polar direction of the first sensing magnet 62. In this embodiment, two first sensing elements 92 can sense the displacement of the first sensing magnet 62 relative to the circuit board 80 along X-axis and Y-axis directions (the horizontal direction), respectively. Furthermore, the second sensing element 94 can sense the displacement of the first sensing magnet 62 relative to the fixed module FP along the Z-axis direction (a vertical direction), wherein the vertical direction (a second direction) is perpendicular to the horizontal direction (the first direction).

As shown in FIG. 6, when observed from the polar direction (Z-axis direction) of the first sensing magnet 62, the first sensing elements 92 at least partially overlap with the second sensing element 94, the first sensing elements 92 also at least partially overlap with the first sensing magnet 62, and the first sensing elements 92 are adjacent to the edge of the first sensing magnet 62 to enhance the sensitivity of sensing.

In addition, in this embodiment, a projected area of the first sensing magnet 62 on a reference surface (XY-plane) is larger than that of the first sensing element 92 on the reference surface, wherein the reference surface is perpendicular to the optical axis O and the polar direction (Z-axis direction) of the first sensing magnet 62. It should be appreciated that the amount of corresponding sensing magnets for the MR sensors used in this embodiment can be reduced while compared to that for traditionally used Hall effect sensors. That is to say, only one sensing magnet is required for corresponding to multiple MR sensors, and thereby design difficulty is reduced. Circuit design of the circuit board can be also simplified. In addition, because the directional sensing characteristic of MR sensors, the MR sensors will not be affected by the movement in axial directions other than the sensing target axis when sensing such that signal distortion will not be caused.

Figure 7:
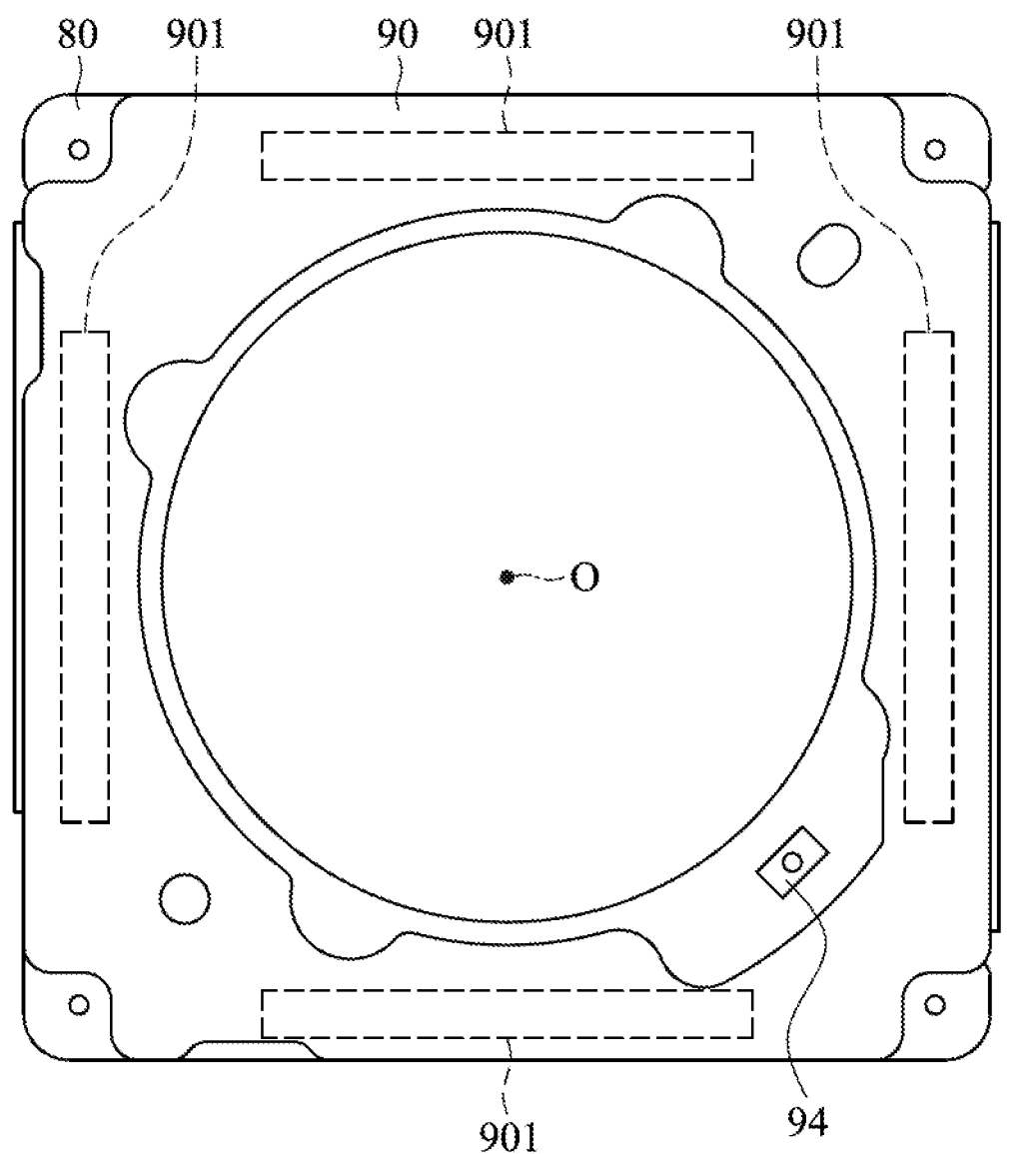
FIG. 7 is a top view illustrating the circuit board, the driving board, and the sensing element in accordance with an embodiment of the present disclosure.

Referring to FIG. 7, FIG. 7 is a top view illustrating the circuit board 80, the driving board 90, and the second sensing element 94 in accordance with an embodiment of the present disclosure. As shown in FIG. 7, the second sensing element 94 is disposed in a corner of the circuit board 80 to avoid coil regions 901, which are located at four sides of the driving board 90 and disposed corresponding to four magnetic elements 60, respectively. Therefore, the coil regions 901 for the coils on the driving board 90 are increased such that the magnetic driving force is enhanced.

Figure 8:
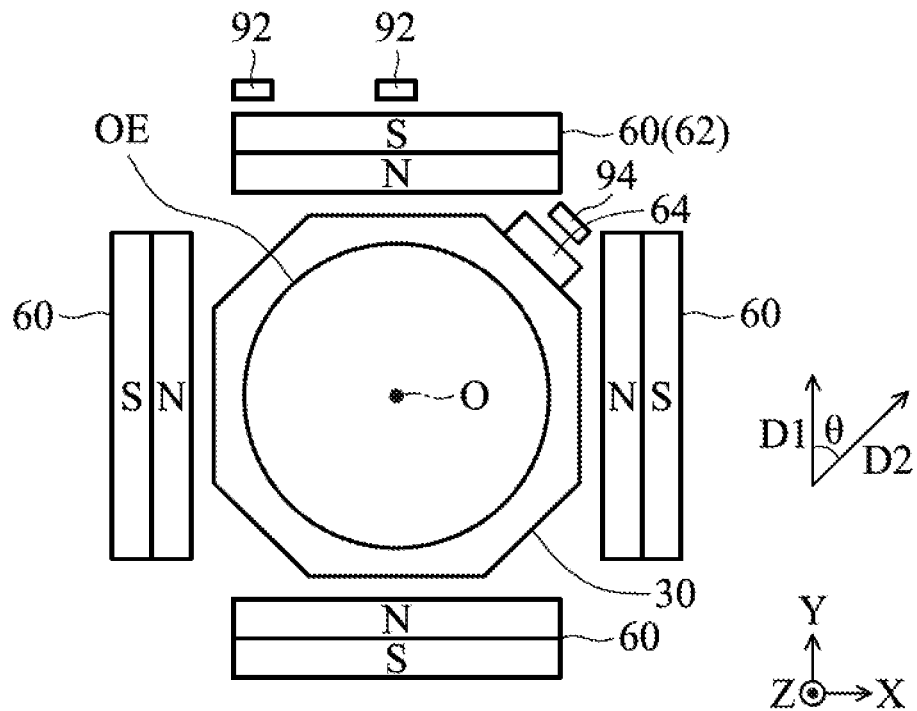
FIG. 8 is a schematic view illustrating relative positions between an optical element, a holder, sensing magnets, and sensing elements in an optical element driving mechanism after assembly in accordance with another embodiment of the present disclosure.

Referring to FIG. 8, FIG. 8 is a schematic view illustrating relative positions between an optical element OE, a holder 30, sensing magnets, and sensing elements in an optical element driving mechanism of another embodiment. In this embodiment, one of four magnetic elements 60 disposed on the frame 50 may be simultaneously used as a first sensing magnet 62, which is disposed corresponding to the optical element OE inside the holder 30. The magnetizing direction D1 of the first sensing magnet 62 is parallel to Y-axis direction. In addition, the optical element driving mechanism further includes a second sensing magnet 64, which is disposed on the holder 30 in the movable module MP, and can move relative to the first sensing magnet 62. In this embodiment, the first sensing elements 92 and the second sensing element 94 are both affixed to the fixed module FP. For example, two first sensing elements 92 may be fixed to the housing 10 for sensing the displacement of the first sensing magnet 62 relative to the fixed module FP along X-axis and Y-axis directions (the first direction), respectively. The second sensing element 94 may be fixed to the base 20 for sensing the displacement of the second sensing magnet 64 relative to the fixed module FP along the Z-axis direction (the second direction).

As shown in FIG. 8, one of the two first sensing elements 92 is adjacent to a center of the first sensing magnet 62, and the position of another of the first sensing elements 92 is close to an edge of the first sensing magnet 62. In this embodiment, the first sensing element 92 adjacent to the center of the first sensing magnet 62 may be configured to sense the displacement of the first sensing magnet 62 in Y-axis direction, and the first sensing element 92 close to the edge of the first sensing magnet 62 may be configured to sense the displacement of the first sensing magnet 62 in X-axis direction.

In this embodiment, the first sensing magnet 62 on the top of FIG. 8 is disposed on the frame 50 and between the holder 30 and the first sensing elements 92. The second sensing magnet 64 is disposed on the holder 30 and between the holder 30 and the second sensing element 94. The height of the optical element driving mechanism in the Z-axis direction may be reduced further to achieve mechanism miniaturization because the first sensing elements 92 and the second sensing element 94 are both affixed to a fixed module FP (such as the housing 10 or the base 20), and are respectively disposed outside the first sensing magnet 62 and the second sensing magnet 64.

It should be noted that the magnetizing direction of the first sensing magnet 62 is not parallel to that of the second sensing magnet 64. In this embodiment, the angle θ between the magnetizing direction D1 of the first sensing magnet 62 and the magnetizing direction D2 of the second sensing magnet 64 is, for example, about 45 degrees.

Figure 9:
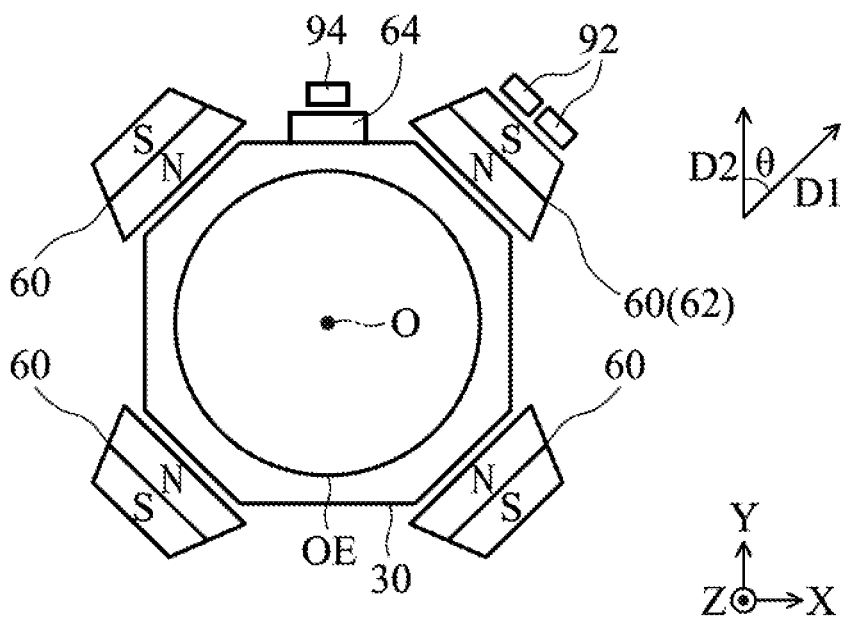
FIG. 9 is a schematic view illustrating relative positions between an optical element, a holder, sensing magnets, and sensing elements in an optical element driving mechanism after assembly in accordance with another embodiment of the present disclosure.

Referring to FIG. 9, FIG. 9 is a schematic view illustrating relative positions between the optical element OE, the holder 30, the sensing magnets, and the sensing elements after assembly in an optical element driving mechanism of another embodiment. In this embodiment, one of four magnetic elements 60 disposed on the frame 50 may be simultaneously used as a first sensing magnet 62, which is disposed corresponding to the optical element OE inside the holder 30. The first sensing magnet 62 is disposed in a corner of the holder 30, and the angle between the polar direction of the first sensing magnet 62 and the sides (X-axis or Y-axis direction) of the rectangle housing 10 is 45 degrees. Through this configuration, the overall volume of the magnetic elements 60 (including the first sensing magnet 62) and the holder 30 may be further reduced to achieve mechanism miniaturization.

In this embodiment, the first sensing magnet 62 is disposed on the frame 50 and between the holder 30 and the first sensing elements 92. The second sensing magnet 64 is disposed on the holder 30 and between the holder 30 and the second sensing elements 94. Furthermore, as shown in FIG. 9, in this embodiment, the magnetizing direction of the first sensing magnet 62 is not parallel to that of the second sensing magnet 64. The angle θ between the magnetizing direction D1 of the first sensing magnet 62 and the magnetizing direction D2 of the second sensing magnet 64 is, for example, about 45 degrees. The size of the optical element driving mechanism in the Z-axis direction may be reduced further to achieve mechanism miniaturization because the first sensing elements 92 and the second sensing element 94 are both affixed to a fixed module FP, and are disposed outside the first sensing magnet 62 and the second sensing magnet 64.

In some embodiments, the optical element driving mechanism 1 may further include a magnetic sensor (not shown), which is disposed on the fixed module FP (such as the housing 10 or the base 20), and corresponding to the first sensing magnet 62 for sensing the amount of rotation of the first sensing magnet 62 relative to the fixed module FP around an axial direction. The axial direction is perpendicular to the polar direction of the first sensing magnet 62.

Figure 10A:
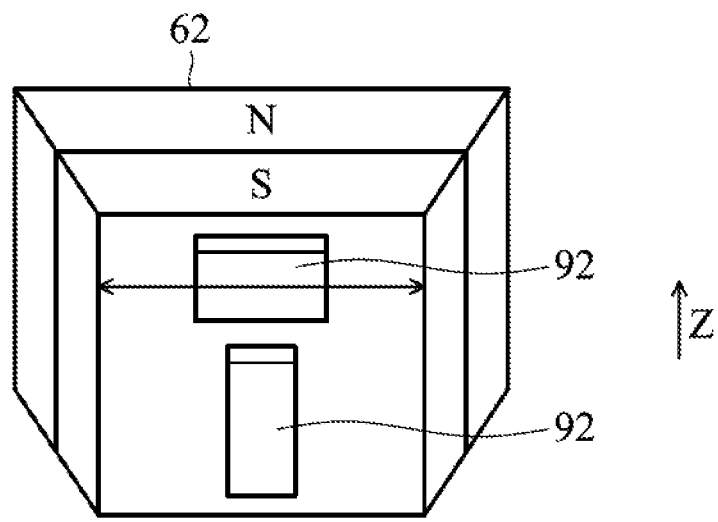
FIG. 10A is a schematic perspective view illustrating relative positions between a first sensing magnet and a first sensing element in accordance with another embodiment of the present disclosure.
Figure 10B:
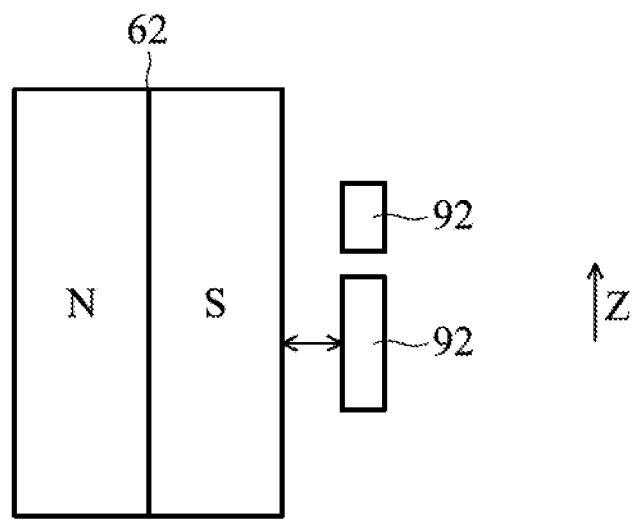
FIG. 10B is a side view illustrating relative positions between the first sensing magnet and the first sensing element shown in FIG. 10A.

Next, referring to FIGS. 10A and 10B, FIG. 10A is a schematic perspective view illustrating relative positions between the first sensing elements 92 and the first sensing magnet 62 in accordance with another embodiment of the present disclosure. FIG. 10B is a side view illustrating relative positions between the first sensing elements 92 and the first sensing magnet 62 shown in FIG. 10A. The difference between this embodiment and the first sensing elements 92 shown in FIG. 9 is that two first sensing elements 92 are arranged along the Z-axis direction, as shown in FIG. 10A, and the upper first sensing element 92 can sense the magnetic field change of the first sensing magnet 62 along a first horizontal direction (shown by the arrow in FIG. 10A), which is generated by rotation or displacement of the first sensing magnet 62. The first horizontal direction is perpendicular to the polar direction (N-pole to S-pole) of the first sensing magnet 62.

In addition, as shown in FIG. 10B, the lower first sensing element 92 can sense the magnetic field change of the first sensing magnet 62 along a second horizontal direction (shown by the arrow in FIG. 10B), which is generated by displacement of the first sensing magnet 62. The second horizontal direction is parallel to the polar direction (N-pole to S-pole) of the first sensing magnet 62, and both the first and second horizontal directions are perpendicular to the optical axis O (Z-axis direction) of the optical element. It should be appreciated that the above-mentioned embodiments are merely examples, and not intended to limit the present disclosure. In some other embodiments, other suitable sensing methods may also be selected for the above sensing elements to sense the magnetic field change of the above sensing magnets.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure, as long as may perform substantially the same function in the aforementioned embodiments and obtain substantially the same result may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

Although the preferable embodiments of the present disclosure have been described above, however, these embodiments are not intended to limit the present disclosure. Those skilled in the art may make some changes and alterations without departing from the spirit and scope of the present disclosure. Therefore, the scope of the present disclosure may be defined referring to the appended claims. Furthermore, each of the appended claims constructs an individual embodiment, and the scope of the present disclosure also includes every combination of the appended claims and embodiments.

What is claimed is:

1. An optical element driving mechanism, comprising:
   a fixed module;
   a movable module movable in a moving range without tilt relative to the fixed module and configured to connect an optical element;
   a driving assembly configured to drive the movable module to move relative to the fixed module, wherein the driving assembly comprises a magnetic element;
   a first sensing magnet movable relative to the magnetic element; and
   a first sensing element disposed corresponding to the first sensing magnet for sensing displacement of the movable module relative to the fixed module parallel to a first direction, wherein the first sensing element does not detect the displacement of the movable module relative to the fixed module in a direction that is not parallel to the first direction,
   wherein when the movable module is located at any position in the moving range, the first sensing magnet and the first sensing element always at least partially overlap in the first direction, and the first sensing magnet and the first sensing element always do not overlap in any direction that is perpendicular to the first direction.

2. The optical element driving mechanism as claimed in claim 1, wherein the first sensing element is a magnetoresistance sensor.

3. The optical element driving mechanism as claimed in claim 1, wherein a polar direction of the first sensing magnet is parallel to an optical axis of the optical element.

4. The optical element driving mechanism as claimed in claim 1, wherein a polar direction of the first sensing magnet is perpendicular to an optical axis of the optical element.

5. The optical element driving mechanism as claimed in claim 1, further comprising a second sensing element disposed corresponding to the first sensing magnet for sensing displacement of the first sensing magnet relative to the fixed module along a second direction, wherein the second direction is perpendicular to the first direction.

6. The optical element driving mechanism as claimed in claim 5, further comprising a circuit board, and the first sensing element and the second sensing element are disposed on opposite sides of the circuit board, wherein the extending direction of the circuit board is different from the arranging direction of the first sensing element and the second sensing element.

7. The optical element driving mechanism as claimed in claim 6, wherein when observed from a polar direction of the first sensing magnet, the first sensing element at least partially overlaps the second sensing element.

8. The optical element driving mechanism as claimed in claim 6, wherein the first sensing element is disposed in a corner of the circuit board.

9. The optical element driving mechanism as claimed in claim 1, further comprising a second sensing element and a second sensing magnet corresponding to each other, wherein the second sensing magnet is disposed on the movable module, and the second sensing magnet is movable relative to the first sensing magnet, and wherein the second sensing element senses the displacement of the second sensing magnet relative to the fixed module along a second direction, wherein the second direction is perpendicular to the first direction.

10. The optical element driving mechanism as claimed in claim 9, wherein an angle between a first magnetizing direction of the first sensing magnet and a second magnetizing direction of the second sensing magnet is substantially 45 degrees.

11. The optical element driving mechanism as claimed in claim 1, further comprising a magnetic sensor corresponding to the first sensing magnet for sensing the amount of rotation of the first sensing magnet relative to the fixed module around an axial direction, wherein the axial direction is perpendicular to a polar direction of the first magnet.

12. The optical element driving mechanism as claimed in claim 1, wherein when observed from a polar direction of the first sensing magnet, the first sensing element at least partially overlaps the first sensing magnet.

13. The optical element driving mechanism as claimed in claim 1, wherein a projected area of the first sensing magnet on a reference surface is larger than a projected area of the first sensing element on the reference surface, wherein the reference surface is perpendicular to a polar direction of the first sensing magnet.

14. The optical element driving mechanism as claimed in claim 1, wherein the first sensing element is adjacent to an edge of the first sensing magnet.

15. The optical element driving mechanism as claimed in claim 1, wherein the first sensing element is adjacent to a center of the first sensing magnet.

16. The optical element driving mechanism as claimed in claim 1, further comprising a third sensing element disposed corresponding to the first sensing magnet for sensing displacement of the first sensing magnet relative to the fixed module along a third direction, wherein the third direction is parallel to a polar direction of the sensing magnet.

17. The optical element driving mechanism as claimed in claim 1, wherein when the movable module moves along the first direction relative to the fixed module, the first sensing magnet is driven to move along the first direction relative to the first sensing element.

* * * * *